(12) United States Patent
Östman

(10) Patent No.: US 9,718,431 B2
(45) Date of Patent: Aug. 1, 2017

(54) PACKAGING METHOD FOR AN AIRBAG, AIRBAG AND A DEVICE FOR FOLDING OR ROLLING AN AIRBAG

(75) Inventor: Martin Östman, Vårgårda (SE)

(73) Assignee: AUTOLIV DEVELOPMENT AB, Vargarda (SE)

( * ) Notice: Subject to any disclaimer, the term of this patent is extended or adjusted under 35 U.S.C. 154(b) by 812 days.

(21) Appl. No.: 13/699,467

(22) PCT Filed: May 9, 2011

(86) PCT No.: PCT/SE2011/050584
§ 371 (c)(1),
(2), (4) Date: Nov. 21, 2012

(87) PCT Pub. No.: WO2011/149407
PCT Pub. Date: Dec. 1, 2011

(65) Prior Publication Data
US 2013/0062869 A1    Mar. 14, 2013

(30) Foreign Application Priority Data

May 28, 2010    (DE) .................. 10 2010 021 823

(51) Int. Cl.
*B60R 21/237*    (2006.01)
*B60R 21/232*    (2011.01)

(52) U.S. Cl.
CPC .......... *B60R 21/237* (2013.01); *B60R 21/232* (2013.01); *B60R 2021/2375* (2013.01)

(58) Field of Classification Search
CPC .......... B60R 2021/2375; B60R 21/237; B60R 21/232; B60R 21/2171; B65B 63/04; B65B 63/024; B65B 63/02; B65H 18/08; B65H 18/22; B65H 2301/41386; B65H 2404/265

USPC ............ 493/405, 408, 427, 480; 280/743.1; 53/429, 430, 116, 117, 118, 119, 120
See application file for complete search history.

(56) References Cited

U.S. PATENT DOCUMENTS

| 3,839,947 | A | * | 10/1974 | Kornas et al. ................ 493/244 |
| 3,839,948 | A | * | 10/1974 | Putti ..................... B60R 21/237 |
| | | | | 493/244 |
| 4,114,530 | A | * | 9/1978 | Miller ............................. 100/87 |
| 5,493,846 | A | * | 2/1996 | Baker et al. .................... 53/429 |
| 5,694,737 | A | * | 12/1997 | Lunt ..................... B60R 21/237 |
| | | | | 53/117 |
| 5,775,733 | A | | 7/1998 | Lunt et al. |
| 7,404,790 | B2 | * | 7/2008 | Sugaya et al. ................ 493/458 |
| 2002/0124531 | A1 | * | 9/2002 | Mossbeck et al. ............. 53/430 |
| 2003/0236157 | A1 | * | 12/2003 | Weaver et al. ............... 493/340 |
| 2008/0258442 | A1 | * | 10/2008 | Quach ................... B60R 21/201 |
| | | | | 280/730.2 |

(Continued)

FOREIGN PATENT DOCUMENTS

WO    WO 2009/083056 A1    7/2009

OTHER PUBLICATIONS

International Search Report and Written Opinion of the ISA for PCT/SE2011/050584, ISA/SE, Stockholm, mailed Sep. 12, 2011.

*Primary Examiner* — Thanh Truong
*Assistant Examiner* — Thomas Wittenschlaeger
(74) *Attorney, Agent, or Firm* — Stephen T. Olson; Harness, Dickey & Pierce, P.L.C.

(57) ABSTRACT

A method of rolling or folding an airbag to a thin tight tube, includes stretching the airbag during the rolling or folding in length direction.

17 Claims, 4 Drawing Sheets

(56) References Cited

U.S. PATENT DOCUMENTS

| | | | |
|---|---|---|---|
| 2009/0084508 A1* | 4/2009 | Renz | B60R 5/047 |
| | | | 160/323.1 |
| 2009/0115170 A1* | 5/2009 | Hjerpe | 280/728.2 |
| 2010/0013203 A1* | 1/2010 | Mitchell | B60R 21/232 |
| | | | 280/743.2 |

* cited by examiner

PACKAGING METHOD FOR AN AIRBAG, AIRBAG AND A DEVICE FOR FOLDING OR ROLLING AN AIRBAG

CROSS-REFERENCE TO RELATED APPLICATIONS

This application is a 371 U.S. National Stage of International Application No. PCT/SE2011/050584, filed May 9, 2011 and published in English on Dec. 1, 2011 as WO 2011/149407 A1. This application claims priority to German Patent Application No. DE 102010021823.5, filed May 28, 2010. The disclosures of the above applications are incorporated herein by reference.

FIELD

The invention concerns a packaging method for an airbag, an airbag and a device for folding or rolling an airbag.

BACKGROUND

Airbags are used in vehicles to cover the interior side surface in a vehicle in case of an accident to prevent severe injuries of the occupant. The airbag is mounted above the side windows at a rim of the vehicle structure under the rooflining. As the installation space for the airbag is very limited especially in small cars, the airbag is rolled or folded to a long thin cylinder-shaped package.

For pedestrian protection, airbags are further located at the lower edge of the windshield, which in the event of an accident deploy on the windshield and in the inflated state cover the windshield as well as the pillars of the motor vehicle towards the outside.

One possible embodiment of an airbag, in this case a curtain airbag, and a device for folding or rolling an airbag is known from the WO 2009/083056 A1. The airbag is rolled from a flat structure to a thin cylinder in a device comprising several deflection pulleys and a traction mechanism. The traction mechanism consists of several belts arranged in distances on a basis, wherein the arrangement and the number of the belts depend on the individual shape and dimension of the airbag. The tightness of the airbag in the cylinder shape depends on the traction mechanism and especially on the design and arrangement of the deflection pulleys.

SUMMARY

The object of the invention is to provide an improved packaging method to roll or fold the airbag to a thin tight cylinder, to provide an airbag which is rolled or folded to a thin cylinder with a higher tightness and an improved device for folding or rolling an airbag to a thin tight cylinder.

According to the present teachings, a packaging method is suggested, in which the airbag is stretched during the rolling or folding process in length direction. The advantage of the suggested solution is that any folds in length direction are pulled out of the airbag during the rolling or folding process, so that the airbag can be rolled or folded to a thin cylinder having a greater tightness.

The folds can be pulled out very efficiently, when the airbag is stretched in an angle, preferably perpendicular, to the folding direction, or when the airbag is stretched in a direction essentially parallel to the rolling axis.

Furthermore, it is suggested that the airbag is stretched between two end sections defining a stretch-line, and the airbag comprises several attachment points for a fixation of the airbag at a vehicle structure, and the stretch-line is arranged in the opposite half of the airbag with respect to the attachment points. The stretch-line defines the centre from where the folding or rolling of the airbag starts. Because the stretch-line is arranged in the opposite half, the rolling or folding process of the airbag starts first with the opposite half of the airbag, so that the attachment points are not folded or rolled into the airbag and are therefore afterwards freely accessible.

Furthermore, an airbag is suggested which is rolled or folded to a thin cylinder according to one of the suggested packaging methods, wherein the airbag comprises two end sections between which the airbag is stretched. The advantage of the proposed airbag is that the connecting line between the end sections defines a stretch-line for a controlled rolling or folding process. Depending on the geometry of the airbag, the end sections may be arranged in such a way that any folds are pulled out to a maximum over the length extension of the airbag. A very efficient rolling or folding process can be provided when the end sections are arranged in such a way that the distance between the end sections is as big as possible.

Furthermore, it is suggested that the end sections are located in side areas of the airbag, wherein at least one of the side areas protrudes sidewise from the airbag. The advantage of the suggested embodiment is that the end section which is arranged in the protruding side area is not folded or rolled between the layers of the folded or rolled airbag, so that the end section is freely accessible after the rolling or folding process. Furthermore, the airbag is stretched along the total or a maximum length, so that any folds in not stretched areas are avoided or at least reduced to a minimum.

The end sections are provided in another preferred embodiment with attachment sections, by which the stretching forces can be easily applied to the airbag. The attachment sections may be designed for example as cut-out holes. One important aspect for designing the attachment sections is that they comprise the necessary strength to transmit the force applied to the airbag during the folding or rolling process.

Furthermore, a device for folding or rolling an airbag to a thin tight cylinder according to one of the suggested packaging methods is suggested, wherein the device comprises a stretching unit consisting of at least two lateral displaceable fixation devices between which the airbag is attachable at two opposing end sections. The advantage of the suggested device is that the device can be used to roll or fold airbags having different lengths. Furthermore, it is possible to install the airbag in a first step in the device and apply the stretching forces in a second step by displacing the fixation devices.

Moreover, it is suggested that the fixation devices are provided with pivotable mounted fixation elements. The pivotable fixation elements enable a stretching of the airbag with not rotating fixation devices without twisting the end sections of the airbag during the rolling or folding process.

Furthermore, it is suggested that the fixation elements are pivotable with respect to one common rotation axis. The common rotation axis enables a rolling or folding process with a clearly defined orientation with a minimum amount of folds and therefore a rolling or folding of the airbag as tight as possible.

Furthermore, it is suggested that the device comprises at least two rolling or folding units which are laterally displaceable. The arrangement of the rolling or folding units can be therefore adjusted to the individual design of the airbag like total length, or rolling or folding length, so that the airbag can be rolled or folded as equal as possible along the total length. Additionally, the rolling or folding units can be arranged with respect to cut-outs like for example for different pillars of the vehicle.

Another preferred embodiment of the invention can be seen in that the rolling or folding units having a common driving unit. The use of one common driving unit facilitates the design of the device itself and the controlling of the rolling or folding units.

A very simple design of the rolling or folding units can be realised, when the rolling or folding units consist of at least three deflection pulleys and an endless traction element, which is looped around the deflection pulleys, wherein the airbag is inserted into a loop of the traction element between two deflection pulleys. The suggested design of the rolling or folding units is so far advantageous since the design is independent of the airbag itself. The rolling or folding process is performed with an endless traction element, which comprises a loop between two deflection pulleys in which the airbag is inserted during the rolling or folding process. Therefore, the possible rolling or folding length of the airbag is not limited to a special length, and there is no need to change the design, if an airbag with a bigger length needs to be rolled or folded with the device. The movement of the traction element is transmitted to the abutting airbag which is inserted into the loop, while the movement of the traction element in the section of the loop supports the rolling or folding process of the airbag to the thin tight cylinder.

Furthermore, at least one pulley is mounted on a pivotable arm which performs a pivoting movement to tension the traction element. The tensioning of the traction element is performed after the airbag is inserted into the loop, so that a certain slack in the traction element, which is needed to create the loop, is pulled out after the insertion of the airbag by tensioning the traction element. Because the loop defines the cross shape of the rolled or folded cylinder shaped airbag, it is possible to roll or fold the airbag by tensioning the traction element to a tighter tubular shape.

Furthermore, at least one of the pulleys is driven rotationally. The rotational movement of the pulley is transmitted to the traction element, which pulls finally the abutting airbag into the loop.

Furthermore, at least one pulley is mounted on a pivotable arm, wherein the arm performs a pivoting movement to close the loop, in which the airbag is inserted. By closing the loop the airbag is rolled or folded with a greater tightness in the closed loop, without the risk of being widened up during the rolling or folding process. Furthermore, it is avoided that the airbag which is pulled into the loop escapes out of the loop.

DESCRIPTION OF THE DRAWINGS

In the following the invention is described more detailed with respect to one preferred embodiment. The figures show in detail.

DETAILED DESCRIPTION

Figure 1:
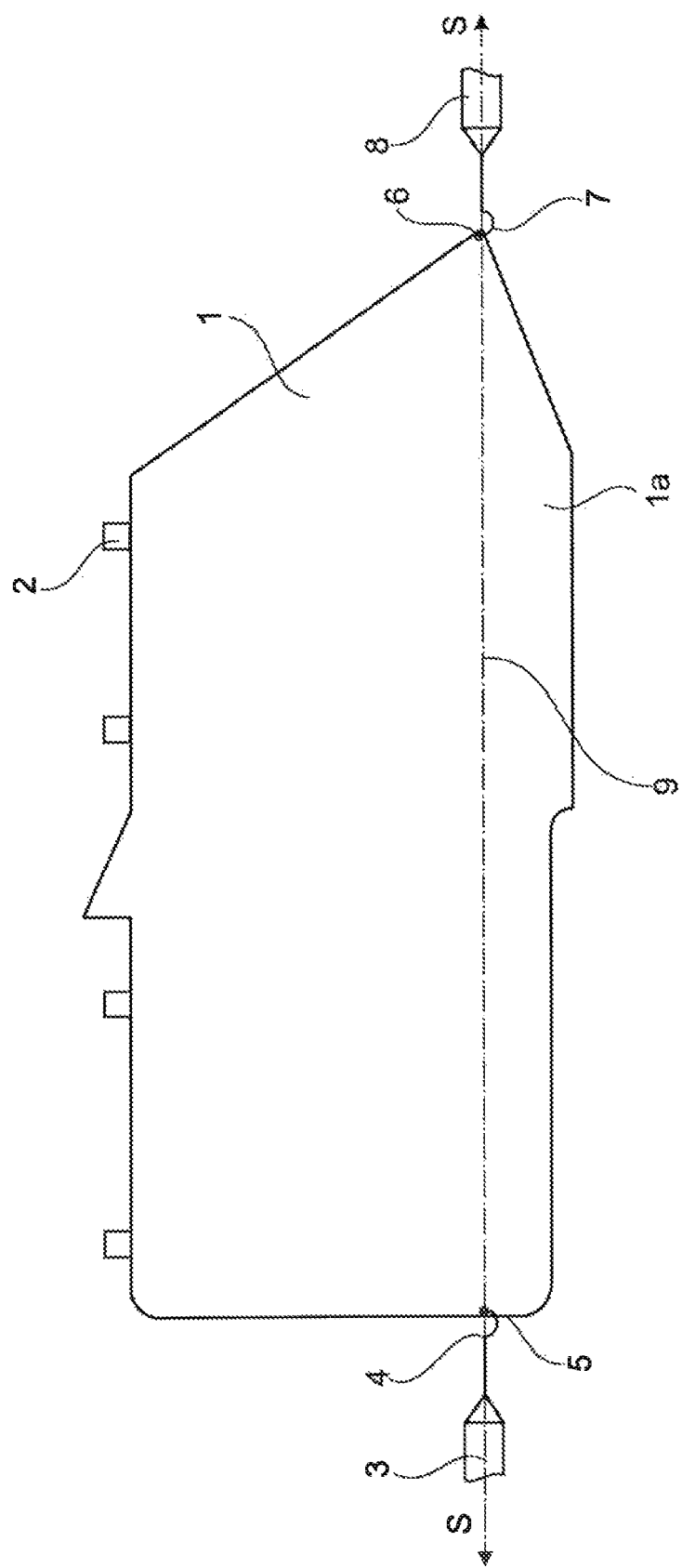
FIG. 1: Airbag with a stretch-line.

In FIG. 1 it is shown an inflatable airbag 1 before the rolling or folding process. The rolling or folding process might consist of a pure rolling or folding process or also of a combination of a rolling and folding process. In the following the process is entitled rolling process, but it is not limited to a pure rolling process. In the sense of the invention, airbags are meant to be in particular large-surface airbags, like for example curtain airbags or pedestrian protection airbags, which have a relatively long length.

The airbag 1 comprises several attachment points 2 at the upper edge defining the final attachment line at the vehicle structure. In the lower half opposite to the attachment points 2 are provided two end sections 5 and 6, each of which comprises an attachment section in the form of a cut-out hole. The end section 6 protrudes sidewise from the airbag 1, so that the distance between the end section 5 and 6 complies approximately with the maximum length of the airbag 1. Furthermore, there are two stretching units in the form of fixation devices 3 and 8 visible, which comprise fixation elements in the form of hooks 4 and 7 engaging into the cut-out holes in the end sections 5 and 6. The hooks 4 and 7 are mounted pivotably at the fixation devices 3 and 8.

The fixation devices 3 and 8 are exerting during the rolling process a stretching force S, so that the airbag 1 is stretched in length direction along a stretch-line 9, which is identical with the connection-line between the end sections 5 and 6. Since the hooks 4 and 7 are mounted pivotably at the fixation devices 3 and 8, it is possible to roll or fold the airbag 1 with non rotating fixation devices 3 and 8. Because the stretch-line 9 is not identical with the lower edge of the airbag 1, there is also a section 1a of the airbag 1 in the form of a thin tab below the stretch-line 9.

Figure 2:
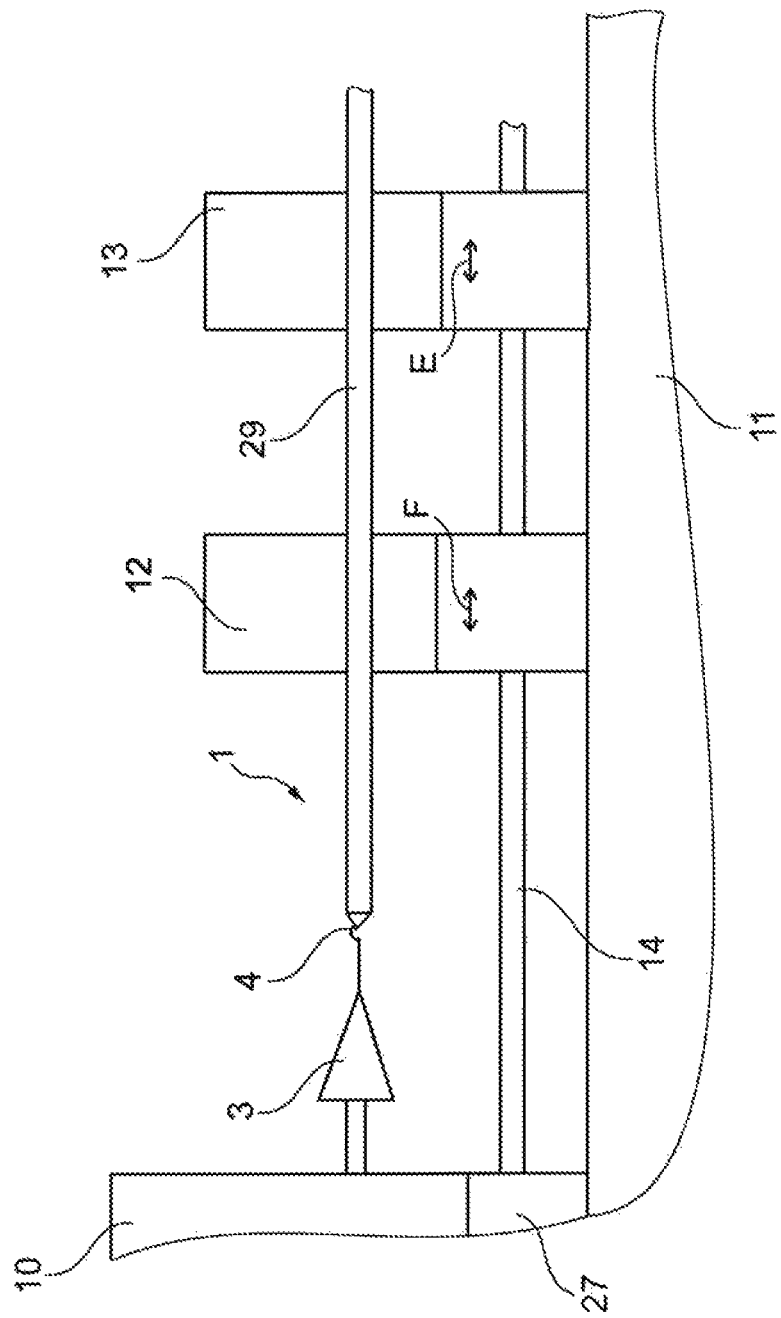
FIG. 2: Device for rolling or folding an airbag.

In FIG. 2 it is shown a cut-out of a device for rolling the airbag 1, here shown as a tight rolled cylinder 29 after the rolling process. The fixation device 3 is attached at a displaceable flange 10, which is arranged on a base 11 of the device. The flange 10 is displaced to adjust the device for rolling an airbag 1 having a predetermined length or it can be also displaced after the airbag 1 is fixed via the end section 5 and the engaging hook 4 to stretch the airbag 1 along the stretch-line 9 before the rolling process starts. The fixation device 3 can be also provided with a driving unit like an electric motor for driving the hook 4 rotationally during the rolling process of the airbag 1. Furthermore, the device comprises several rolling units 12 and 13, which are displaceable in directions E and F with respect to the base 11.

Figure 3:
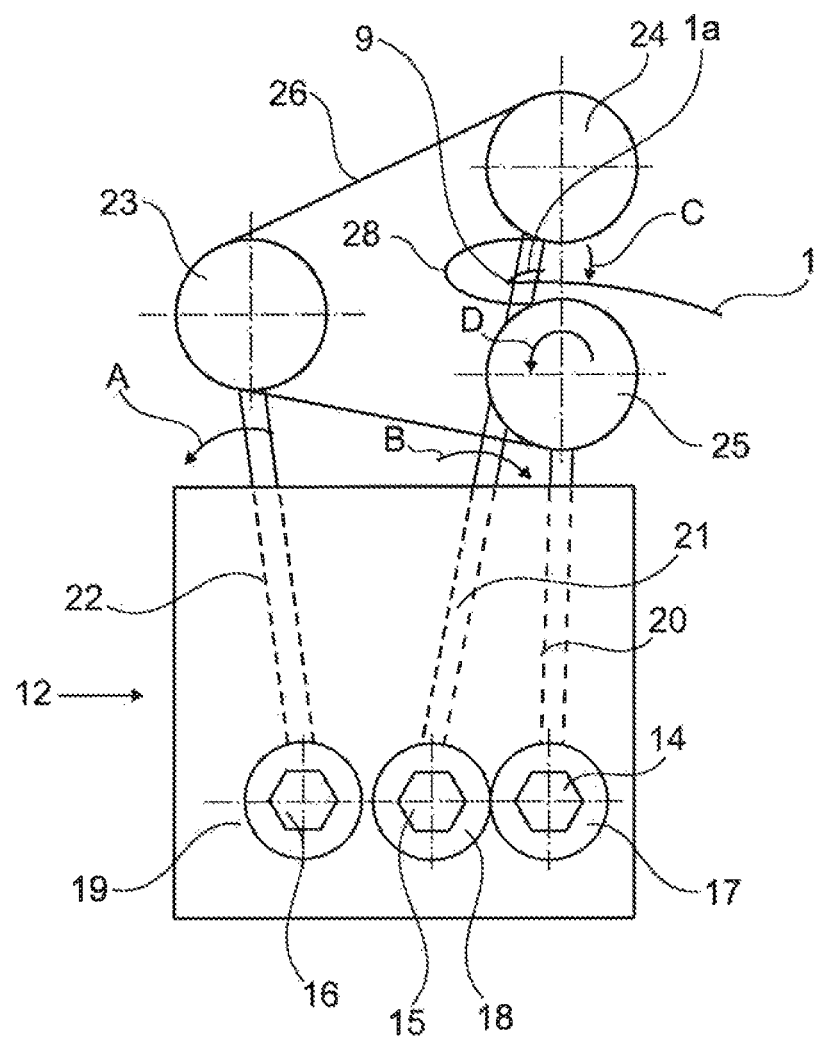
FIG. 3: Rolling or folding unit.

In FIG. 3 it is shown one rolling unit 12 in side view. The rolling unit 12 comprises three deflection pulleys 23,24 and 25 and a traction element 26 in the form of a belt, which is looped around the deflection pulleys 23,24 and 25. The traction element 26 comprises in the section between the deflection pulley 24 and the deflection pulley 25 a loop 28 in which the airbag 1 is inserted with the stretch-line 9. When the airbag 1 is inserted with the stretch-line 9 into the loop 28, the section 1a is folded backwards onto the part of the airbag 1 above the stretch-line 9 in FIG. 1. The stretch-line 9 separates the section 1a from the rest of the airbag 1.

The deflection pulleys 23,24 and 25 are mounted on arms 20,21 and 22, which comprise bushings 17,18 and 19 at their ends. The bushings 17,18 and 19 are designed with openings having a polygonal profile. The device further comprises three parallel bars 14,15 and 16, from which the bar 14 is also visible in FIG. 2. The bars 14,15 and 16 are provided with a profile in cross-section which is identical to the polygonal profile of the openings in the bushings 17,18 and 19. The bars 14,15 and 16 are driven individually by a driving unit 27, wherein each bar 14,15,16 is connected via one bushing 17,18 or 19 and one arm 20,21 or 22 with one deflection pulley 23,24 and 25 of one function in the rolling units 12 and 13. The bars 14,15 and 16 are arranged in parallel, so that the rolling units 12 and 13 are displaceable with respect to the base 11 and the deflection pulleys 23,24 and 25 can be driven independently of the rolling units 12 and 13.

After the airbag 1 is inserted with the stretch-line 9 into the loop 28, the deflection pulley 24 is driven via the pivotable arm 21 which performs a pivoting movement in arrow direction "B" and the loop 28 is closed by moving the deflection pulley 24 towards the deflection pulley 25 in arrow direction "C" until the airbag 1 is clamped between the deflection pulleys 24 and 25 with the traction element 26 arranged in between. At the same time or after a short time delay, the deflection pulley 23 performs a pivoting movement in arrow direction "A" to tension the traction element 26 and to minimise the dimension of the loop 28.

Figure 4:
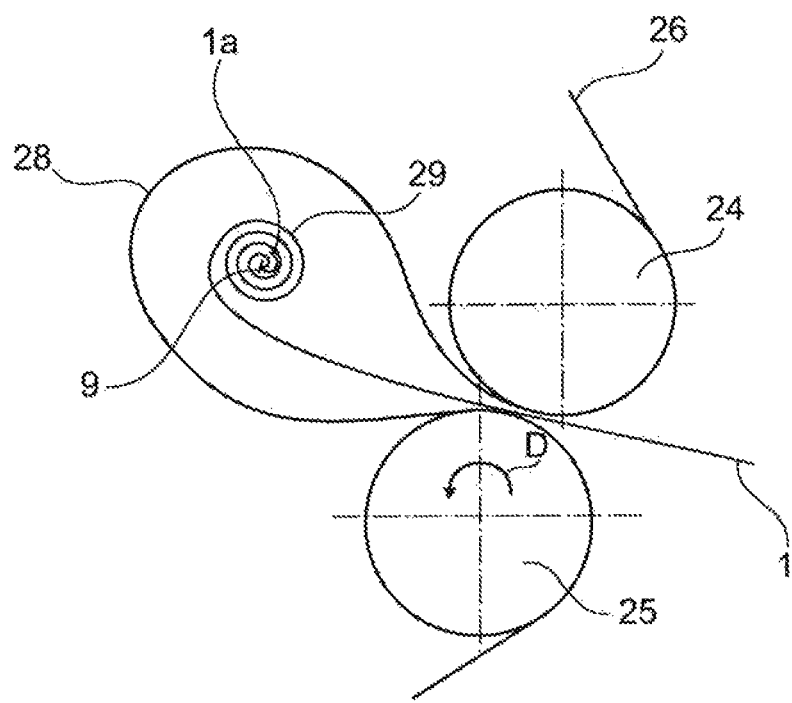
FIG. 4: Airbag rolled to a cylinder in a closed loop of the traction element.

When the loop 28 is closed and the traction element 26 is tensioned, as shown in FIG. 4, the deflection pulley 25 is driven to a rotational movement in direction of arrow "D" and pulls therefore the airbag 1 into the loop 28. As the traction element 26 performs in the section of the loop 28 a movement defined by the shape of the loop 28 itself, the airbag 1 is rolled in the loop 28 to a tight cylinder 29. The rotational movement for winding the airbag 1 might be supported by a rotational drive of the hooks 4 and 7.

The invention claimed is:

1. A method of rolling an airbag, the method comprising:
   using a pair of fixation devices to engage opposing lateral edges of the airbag and to pull the lateral edges in opposite directions to generate a stretching force at a pair of spaced apart points which are longitudinally aligned with a stretch-line, and using the stretching force to stretch the airbag along the stretch-line; and
   while using the pair of fixation devices to maintain the stretching force along the stretch-line, simultaneously engaging the airbag at least at one point laterally inwardly of the spaced apart points but axially aligned with the stretch-line, and rolling the airbag about the stretch-line such that the stretch-line defines an axis about which the airbag is rolled.

2. The method according to claim 1, wherein stretching the airbag includes stretching the airbag at an angle to a rolling direction.

3. The method according to claim 1, wherein stretching the airbag includes stretching the airbag at an angle perpendicular to a rolling direction.

4. The method according to claim 1, wherein stretching the airbag includes stretching the airbag between two end sections, and the airbag includes several attachment points for fixation of the airbag at a vehicle structure, the stretch-line is arranged in an opposite half of the airbag with respect to the attachment points.

5. The method according to claim 1, wherein the airbag has a maximum length extending between first and second end sections, and wherein the method further comprises engaging first and second stretching units with the first and second end sections, respectively.

6. The method according to claim 5, further comprising:
   attaching the first and second stretching units to the airbag at first and second attachment points along the stretch-line; and
   rotationally driving a fixation element of the first stretching unit to roll the airbag.

7. The method according to claim 1, wherein the airbag includes a tab formed adjacent the stretch-line and wherein rolling the airbag about the stretch-line includes folding the tab back over a portion of the airbag.

8. A device for rolling an airbag, the device comprising:
   a stretching unit having at least first and second displaceable fixation devices between which the airbag is attachable at two opposing end sections, the first and second displaceable fixation devices movable relative to one another for applying a stretching force for continuously stretching the airbag along a stretch-line, the stretch-line defining a first longitudinal axis;
   a rolling unit for taking up a length of the airbag which extends along a second longitudinal axis generally perpendicular to the first longitudinal axis, the rolling unit operating to engage the airbag at a location along the stretch-line which is between the opposing end sections, and to roll the airbag about the stretch-line while the first and second displaceable fixation devices continuously apply the stretching force, and wherein the stretch-line defines an axis about which the airbag is rolled;
   at least two rolling units which are laterally displaceable; and
   at least three deflection pulleys and an endless traction element which is looped around the deflection pulleys, and wherein the airbag is inserted into a loop of the traction element between two pulleys.

9. The device according to claim 8, wherein the fixation devices are provided with pivotable mounted fixation elements.

10. The device according to claim 9, wherein the fixation elements are pivotable with respect to one common rotation axis.

11. The device according to claim 8, wherein the rolling units have a common driving unit.

12. The device according to claim 8, wherein at least one deflection pulley is mounted on a pivotable arm which performs a pivoting movement to tension the endless traction element.

13. The device according to claim 8, wherein at least one of the deflection pulleys is driven rotationally.

14. The device according to claim 13, wherein the at least one of the deflection pulleys is mounted on a pivotable arm which performs a pivoting movement to close the loop, in which the airbag is inserted.

15. The device according to claim 8, wherein the airbag has a maximum length extending between first and second end sections and the first and second displaceable fixation devices are adapted to releasably engage the first and second end sections, respectively.

16. The device according to claim 8, wherein the stretching unit includes a rotationally driven fixation unit for rolling the airbag about the first longitudinal axis defined by the stretch-line.

17. The device according to claim 8, in combination with the airbag, the rolling unit engaging the airbag at the location along the stretch-line.

* * * * *